INVENTOR
TADAO KOHASHI
BY Stevens, Davis, Miller & Mosher
ATTORNEYS

ENERGY-RESPONSIVE LUMINESCENT DEVICE

Filed Jan. 25, 1968 2 Sheets-Sheet 2

INVENTOR
TADAO KOHASHI

BY [signature]

ATTORNEYS

United States Patent Office 3,525,014
Patented Aug. 18, 1970

3,525,014

ENERGY-RESPONSIVE LUMINESCENT DEVICE

Tadao Kohashi, Yokohama, Japan, assignor to Matsushita Electric Industrial Co., Ltd., Osaka, Japan, a corporation of Japan Filed Jan. 25, 1968, Ser. No. 700,454
Claims priority, application Japan, Jan. 30, 1967, 42/6,849
Int. Cl. H05b 37/00, 39/00
U.S. Cl. 315—169 3 Claims

ABSTRACT OF THE DISCLOSURE

An energy-responsive luminescent device comprising an electro-luminescent element which is excited by an alternating voltage supplied through a capacitor; and an energy-responsive element (for example, a photo-electroconductive element) connected in series to said electro-luminescent element so that said energy-responsive element controls the bias voltage to said electro-luminescent element in response to an input energy, thereby controlling the luminescent output from said device; thus providing a very high luminescent output, an extremely high sensitivity and controllability.

Figure 1:
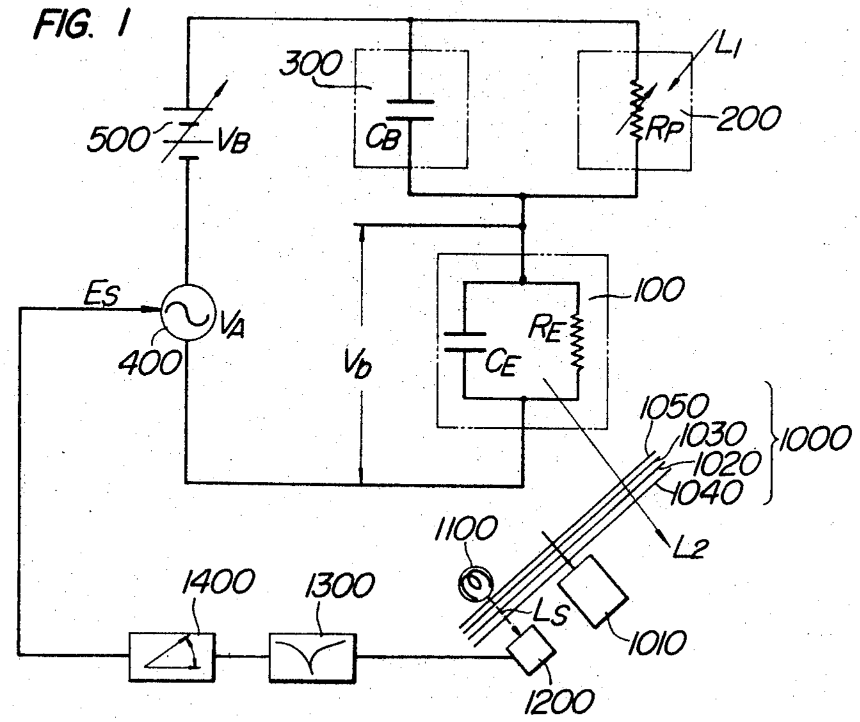

This invention relates to an energy-responsive luminescent device comprising an electro-luminescent element and an energy-responsive element which varies at least in its electric resistance in response to a variation of energy applied thereto.

Hitherto, various types of photo-amplifying device which comprises a combination of an electro-luminescent element and a photo-electroconductive element as the energy-responsive element, have been proposed. However, such conventional devices have been based on controlling the AC power which contributes to the luminescence of the electro-luminescent element, by varying the AC impedance of the photo-electroconductive element in relation to an incident energy such as light or radio-active rays. As is well known, the photo-electroconductive sensitivity of a photo-electroconductive element is much lower under an AC voltage than under a DC voltage. Generally, a photo-electroconductive element can be represented by an equivalent electric circuit consisting of a capacitance and a resistance connected in parallel to each other, the former being determined by the material and dimensions of the element and the latter being variable according to the energy excitation. Thus, the equivalent circuit or the element has a low AC impedance determined by the capacitance, however high the variable resistance is. Accordingly, in order to effectively vary the AC impedance of a photo-electroconductive element by an energy excitation, the impedance of the variable resistor should be of the same or lower order compared with the impedance of the parallel-connected capacitor. Therefore, in the range of intensity of the energy excitation where the variable resistor has a higher impedance than that of the parallel capacitor, it is impossible to control the AC power for exciting the electro-luminescent element by the above-mentioned energy excitation. On the other hand, the impedance of a photo-electroconductive element has a lower limitation because of the saturating photo-electric characteristics. Therefore, a considerable voltage is consumed in the photo-electroconductive element, thereby limiting the luminescent output taken from the electro-luminescent element.

For the above-mentioned three reasons, the conventional photo-amplifying devices have been limited in the energy amplifying factor and the sensitivity, thus the operation of a high sensitivity being substantially unattainable.

An object of this invention is to overcome the above-mentioned disadvantages of the conventional devices and to provide a unique energy-responsive luminescent device of high sensitivity and high energy amplifying factor.

The energy-responsive luminescent device of this invention comprises means for exciting an electroluminescent element with an AC electric field and means for controlling the AC electro-luminescent wave forms from said AC excited electro-luminescent element, by applying to said element a uni-directional electric field which relates to the electric resistance of an energy-responsive element when said energy-responsive element varies at least its electric resistance in response to an energy excitation, thus operating as an energy-responsive luminescent display device.

Figures 2A, 2B, 2C:
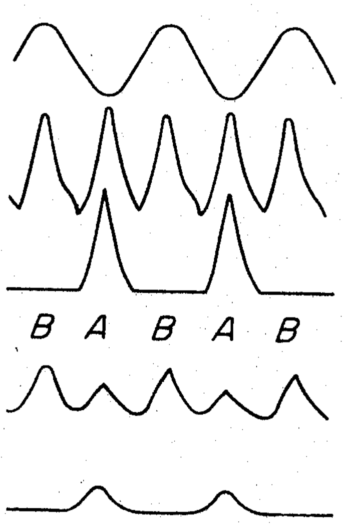
Figure 3:
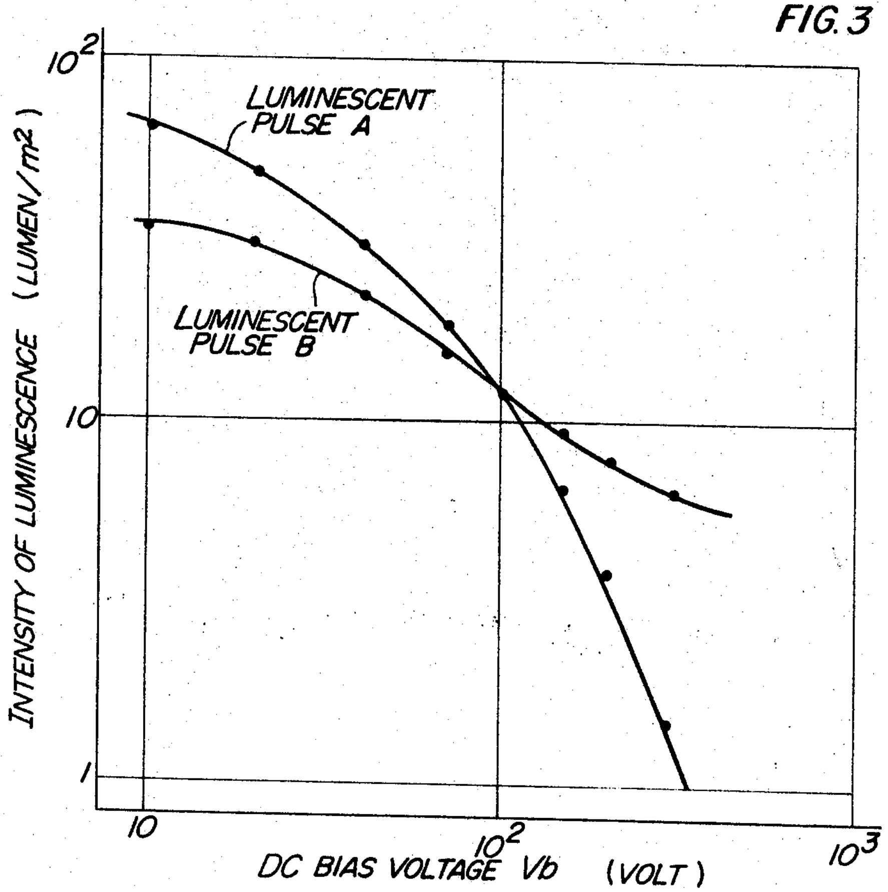
Figure 4:
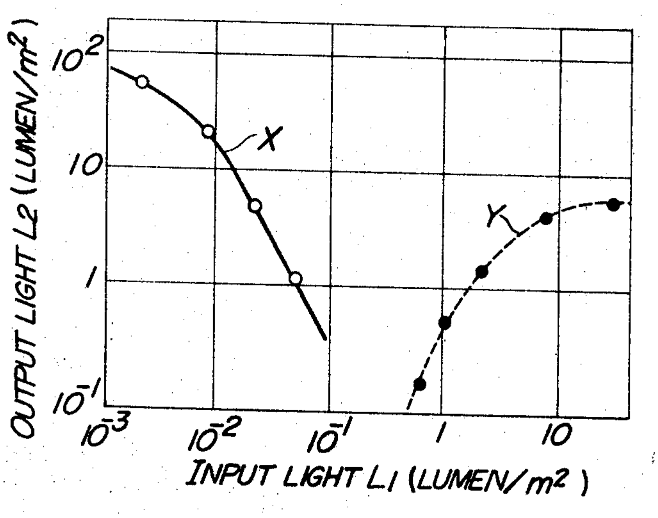

This invention will be described hereinafter by the example of an embodiment where a photo-electroconductive element is used for energy-responsive element, with reference to the attached drawings in which;

FIG. 1 is a diagram showing the constitution of an energy-responsive luminescent device embodying this invention;

FIGS. 2*a*, 2*b*, 2*c*, 2*b'* and 2*c'* show wave forms observed on an oscilloscope in testing the embodiment shown in FIG. 1, including the AC operating voltage, the luminescent output from the electro-luminescent element and selectively separated luminescent pulses;

FIG. 3 is an experimentally determined diagram which shows the relations between the intensity of luminescence and the applied DC bias voltage $V_b$ as to each of two types of luminescent pulses A and B of the electro-luminescent element; and FIG. 4 is an experimentally obtained diagram showing the operating characteristics of the embodiment shown in FIG. 1 as compared to that of a conventional device.

Now, referring to FIG. 1, the figure which shows the constitution of an embodiment of the energy-responsive luminescent device according to this invention, includes a representation of the device by an equivalent electric circuit.

As is well known, the wave form of luminescent output from an electro-luminescent element (hereafter referred to as an EL element) which contains an electroluminescent material, for example, in an electro-resistive (uni-directionally semiconductive) or an accumulatively polarizable dielectric medium, when the element is excited with an AC electric field, can be controlled by a DC electric field applied thereto. Here, an accumulatively polarizable dielectric medium means a medium which sustains the inner electric field when a polarizng DC voltage is applied to it from outside and holds a residual of said electric field when said electric field has been removed. An EL element as mentioned above which is excited with an AC electric field and the output luminescent wave form of which is controlled by a DC (uni-directional) electric field applied thereto, is referred to as an AC–DC EL element hereafter.

FIG. 1 shows an equivalent circuit in which an AC–DC EL element 100 represented by resistor $R_E$ and capacitor $C_E$ is connected in series to a photoelectroconductive element 200, that is, energy-responsive element, the resistance $R_P$ of which varies according to the incident light $L_1$ as an incident energy and a bypass capacitor element 300 having a capacitance $C_B$, the latter two elements being connected in parallel. An AC voltage source 400 and a DC voltage source 500 are connected to the above combined circuit, thus to apply an AC operating voltage $V_A$ superimposed by a DC bias voltage $V_B$ to the circuit.

The AC luminescent power of the AC–DC EL element 100 is supplied mainly through the bypass capacitor 300 and is taken out as a luminescent output $L_2$.

The luminescent wave form of the AC luminescent output $L_2$ can be controlled by varying the DC bias voltage $V_b$ of the element 100 by the variable resistor $R_P$ of the photoelectroconductive element 200, which in turn varies relating to the input light $L_1$.

As this variation in wave form or intensity of the the luminescent output relates to the intensity of input light $L_1$, a variation in input light $L_1$ can be detected as a large variation in luminescent output $L_2$.

If the AC impedance of the bypass capacitor 300 is selected to be an appropriate value lower than that of either the photoelectroconductive element 200 or the AC–DC EL element 100, a very small portion of the AC source voltage is allotted to the photoelectroconductive element 200, thus making the use of uni-directional photoelectroconductivity possible. On the other hand, as a substantial portion of the AC voltage $V_A$ is applied to the AC–DC EL element 100, a high luminescent output near the maximum value of the EL material can be obtained.

Accordingly, if the maximum value $R_{PD}$ of the resistor $R_P$ of the photoelectroconductive element 200 and the value of the resistor $R_E$ of the AC–DC EL element 100 are selected so that either $R_{PD}$ is of the same order as $R_E$ or slightly higher than $R_E$, the wave form of the AC luminescent output $L_2$ is effectively controlled by the DC voltage $V_b$ which varies in response to the input light $L_1$ to the resistor $R_P$, and a very high sensitivity of operation will be attained, the minimum detectable input light intensity $L_{1\ min}$ of the energy-responsive luminescent device being equal to that of the photoelectroconductive element 200.

FIG. 2 shows wave forms taken in testing the device shown in FIG. 1 when $V_A$ is 150 v. ($f$=1 kc.) and $V_B$ is 400 v.

The AC–DC EL element 100 in this embodiment was an EL cell of $S_{EL}=4.1\times 2.6$ cm.$^2$ in area which was manufactured by mixing powder of green luminescent ZnS EL fluorescent material with a dielectric medium, more particularly tricresylic phosphate which is accumulatively polarizable and electro-resistive and then by applying the mixture between two plates of nesa-coating glass. With this element $C_E$ was $10^3$ $pF$ and $R_E$ was $5\times 10^6$ ohms. The photoelectroconductive element 200 in this embodiment was a transversally conductive sintered CdS photoelectroconductive cell having an area $S_{PC}=0.9\times 1.3$ cm.$^2$, and its maximum resistance $R_{P\ max}$, i.e., electric resistance with no incident light was $5\times 10^{10}$ ohms. As the bypass capacitor 300, an oil-filled capacitor of $C_B$=8 $\mu$f. was used. As input light $L_1$, a green EL light was used as in the AC–DC EL element 100.

FIG. 2*a* shows the wave form of the operating AC voltage $V_A$, that is, alternating voltage applied to the AC–DC EL element 100, as measured at the nesa-coating light-pervious electrode on the luminescent ouput side, the potential at the other electrode or the electrode on the opposite side being used as base potential.

FIG. 2*b* shows the wave form of the AC excited EL output from the AC–DC EL element 100 when the photoelectroconductive element 200 has no input light, while FIG. 2*b'* shows a similar wave form when the photoelectroconductive element 200 has an input light $L_1$. It will be noted that two types of luminescent pulses A and B occur during each cycle of the AC voltage $V_A$. As seen from FIGS. 2*b* and 2*b'*, the input light $L_1$ decreases the resistance of $R_P$ and increases the bias voltage $V_b$. Accordingly, the wave form of the luminescent pulses A and B vary so as to decrease the intensity of the pulses. Therefore, in the energy-responsive luminescent device of this embodiment, the luminescent output $L_2$ is a decreasing function in relation to the input energy or incident light $L_1$.

It will be clear from a comparison of the luminescent pulses A and B that the percentage of variation in the wave form caused by the DC bias voltage $V_b$ is different for the pulses A and B.

Therefore, in order to expand the controllable range of the luminiscent output $L_2$ and thereby to attain an operation of high sensitivity, it is necessary to selectively use the pulse of higher percentage of said variation out of the luminescent pulses A and B.

FIG. 3 which shows the intensity of the luminiscent pulses A and B for various values of the DC bias voltage $V_b$, indicates that the rate of decrease of the luminescent pulse A is very high for a negative excursion of $V_A$ (that is, when the electrode on the luminescent output side is of negative potential in relation to the other electrode).

Now, in order to selectively separate the luminescent pulse A, a mechanical light chopper 1000 which operates in synchronization to the AC operating voltage $V_A$, is used as shown in FIG. 1.

This light chopper 1000 comprises a synchronous motor 1010 connected to the commercial AC power supply, rotary discs 1020 and 1030 provided with uniformly spaced slits of the same size and same number, said discs 1020 and 1030 being adjacent to each other, and stationary discs 1040 and 1050 which are facing, with a narrow gap interspaced, to the rotary discs 1020 and 1030 respectively. Chopping width, that is, the width of the luminescent light $L_2$ to be selectively separated, can be easily adjusted by relatively shifting the angular positions of said rotary and stationary discs. In order to make the chopping frequency identical and synchronized with the frequency of the operating voltage $V_A$, the light from an auxiliary light source 1100 is chopped by the light chopper to produce rectangular light pulses $L_S$. These light pulses are converted into rectangular pulses of voltage through a photo-electric converter 1200 which utilizes, for example, a PbS photo-electroconductive element, and then supplied to a frequency selecting amplifier 1300 to select the fundamental sinusoidal wave, which, in turn, is supplied to a variable phase shifter 1400. The output from said phase shifter is used for input signal voltage $E_S$ to the AC voltage source 400. The previously-mentioned operating voltage $V_A$ of 1 kc. has thus been controlled. For the selective separation of a portion of the luminescent pulses, the light chopper 1000 must open for the desired pulses and close for the other pulses. This timing of operation is essential. In this embodiment, the timed operation of the light chopper 1000 in relation to the luminescent pulse is attained by adjusting the relative phase of the input signal voltage $E_S$ and accordingly the operating voltage $V_A$, through the phase shifter 1400.

FIGS. 2*c* and 2*c'* show thus separated luminescent pulses A which are utilized as output light $L_2$ related to input light $L_1$.

In the embodiment of this figure, the relative angular positions of the stationary and rotary discs of the light chopper 1000 was set so that the width (period) of the selective separation is half a cycle of the operating voltage $V_A$. That is, the opening period of the chopper 1000 was equal to the closing period. FIG. 2*c* shows the selectively separated luminiscent pulses A related to the pulses in FIG. 2*b* when there is no incident light, and FIG. 2*c'* shows similar pulses A related to the ones in FIG. 2*b'* when there is an incident light $L_1$. It will be seen from a comparison of FIGS. 2*b'* and 2*c'* that without the masking effect by the luminescent pulses B, an output light $L_2$ of wider range of brightness can be taken through the chopper 1000 and output light $L_2$ decreases at a high rate with the increase of input light $L_1$.

The solid line X in FIG. 4 is an operating characteristics which indicates the relation between input light $L_1$ and output light $L_2$ consisting of the luminescent pulses A as described above.

As the spectrum distributions of lights $L_1$ and $L_2$ is identical, the ratio of the variation of the output $L_2$ to that of the input $L_1$ indicates the energy amplifying factor of this device.

As seen from the characteristics X, the energy amplifying factor $G_E$ is of the order of $10^4$ when the ratio of the areas of the elements 100 and 200 ($S_{EL}/S_{PC}=9.2$) is taken into consideration, and the minimum detectable input light intensity $L_{1\ min}$ is of the order of $10^{-3}$ lumen/m.$^2$. This means that the sensitivity and the energy amplifying factor of this device are very high.

The dotted line Y in FIG. 4 is an operating characteristics of a conventional system in which the same EL element 100 and photo-electroconductive element 200 as the ones used in the above embodiment are connected in series, the same AC operating voltage $V_A$ (150 v.) of 1 kc. being applied and the same green EL light is used as input light $L_1$ as in the above embodiment.

Both the luminescent pulses A and B, not being separated, were measured as output light $L_2$.

In the conventional system, as is well known, output light $L_2$ is an increasing function in relation to input light $L_1$, the AC power contributing to the EL operation being controlled by the variation in the AC impedance of the photo-electroconductive element.

As seen from the characteristics Y, the minimum detectable input $L_{1\ min}$ of the conventional system is $10^{-1}$ lumen/m.$^2$ and the energy amplifying factor $G_E$ is approximately 10. Moreover, the maximum output brightness $L_{2\ max}$ is about one-tenth of that of the present invention in spite of the fact that both of the luminescent pulses A and B are included in output light $L_2$, because of the AC voltage loss in the photo-electroconductive element.

Thus, it will be clear from the characteristics X and Y that the minimum detectable input light intensity $L_{1\ min}$ in the device of this invention is less than one-hundredth of that of the conventional device, that the maximum output brightness $L_{2\ max}$ is about ten times and that the energy amplifying factor $G_E$ is about a thousand times the corresponding conventional values.

In the above embodiment of this invention, the maximum resistance $R_{P\ max}$ (electric resistance under no light input) of the photo-electroconductive element 200 is by far higher than the parallel resistance $R_E$ of the AC–DC element 100, the two resistances not being in a matched relation when considered as a DC circuit. If $R_{P\ max}$ is selected to be equal to or slightly higher than $R_E$, as stated previously, the minimum detectable input light intensity $L_{1\ min}$ in this invention can become the same as that of the photo-electroconductive element used, that is $10^{-4}$ to $10^{-5}$ lumen/m.$^2$. Further, the maximum output brightness $L_{2\ max}$ can be raised, by increasing the AC operating voltage $V_A$. With these conditions, the device of this invention can present an energy amplifying factor $G_E$ of the order of $10^5$ to $10^6$ which has been unattainable by conventional devices.

For the actual use of a device of this invention, it is desirable that the operating characteristics such as the gamma value, the range of output brightness and the input detecting sensitivity are controllable.

Such controllability will be attained in the following manners. The first method of controlling is to provide means for making the DC bias voltage $V_B$ adjustable. There is no need to mention that the AC voltage source 400 and the DC voltage source 500 can be combined to one integral source, since the voltages $V_A$ and $V_B$ are applied in superimposed relation to each other.

The wave form control rate for the AC excited EL from an AC–DC EL element 100 is an increasing function of the allotted DC bias voltage $V_b$. Therefore, when $V_B$ is zero volt, control of the wave form will be impossible in spite of the variation in the resistance $R_P$ of the photoelectroconductive element 200, thus the ratio of the ranges of output brightness being 1, the gamma value or contrast being zero and the value of $L_{1\ min}$ being infinite. With an increase of the voltage $V_B$, the wave form control rate of input light $L_1$ increases, the range of output brightness and the absolute value of gamma also increases, and the value of $L_{1\ min}$ decreases, and accordingly the factor $G_E$ increases.

The second method of controlling is to provide means for varying the width or period of said selective separation of the luminescent pulses, as already shown with the light chopper 1000 in FIG. 1.

As described previously, the wave from control rate with a DC bias voltage $V_b$ and an input light $L_1$ is higher for the luminescent pulses A than for the luminescent pulses B. Further, as to the respective luminescent pulses, the control rate of light intensity by $V_b$ and $L_1$ is different depending on the phasic position and width of the selective separation. Therefore, if means with which the width of selective separation of the luminescent pulses is adjustable within one cycle of the AC operating voltage $V_A$ are provided, the intensity of output light $L_2$, the adjustable range of the output brightness, the minimum detectable input $L_{1\ min}$ and the amplifying factor $G_E$ will become controllable.

The third method of controlling is to provide means with which the phasic position of said selective separation can be controlled at least in a period of half a cycle to one cycle of the AC operating voltage $V_A$, as has been described in connection with the phase shifter 1400 shown in FIG. 1.

As described above, the wave form control rate by $L_1$ and $V_b$ is different between the luminescent pulses A and B and further depending on the phasic position of the separation in each cycle of the operating voltage. Therefore, the controllability of the operating characteristics is attained. In this case, if the period of the selective separation of the luminescent wave form is selected to be sufficiently short in comparison to half a cycle of the AC operating voltage $V_A$ and the phasic position of the selective separation is made controllable in a period ranging from one cycle to half a cycle, the variation of output light $L_2$ against the variation of $L_1$ or $V_b$ shows, besides decreasing characteristics as mentioned previously, various characteristics including increasing characteristics and V-shaped or reversed-V-shaped characteristics. Further, a percentage of variation or range of variation of output light $L_2$ due to the variation of $L_1$ or $V_b$ can be made controllable in the above-mentioned various characteristics.

The fourth method of controlling is to provide means for changing the polarity of the DC bias voltage $V_B$.

In the embodiment shown in FIG. 1, the voltage is applied to the element 100 in such a manner that the electrode on the light output side is of negative polarity. If the polarity of the applied voltage is exchanged, the luminescent pulses B will be more affected by the input than the pulses A will. Therefore, controlling of the operating characteristics will be attained by simply reversing the polarity of the voltage $V_B$, without manipulating the means for selectively separating the luminescent pulses. Either the dielectric medium of the AC–DC EL element 100 is electro-resistive or accumulatively polarizable, the control rate of the luminescent wave form by $L_1$ and $V_b$ is lower when the output side electrode is biased in positive polarity than when it is biased negatively. This effect is outstanding especially when the dielectric medium is a resistive one. When a dielectric medium of accumulatively polarizable property is used, the control rates in both polarities may be approximately the same. However, a residual of the DC electric field produced by the DC bias voltage $V_b$ remains even after the voltage $V_b$ was removed. With this accumulating effect, control of the luminescent wave form by input light $L_1$ and bias voltage $V_b$ is irreversible, as the residual polarization is maintained long after $L_1$ and $V_b$ were removed. This effect is very desirable for an accumulative display device of an incident energy, that is, input light $L_1$, while it is desirable that the control of the luminescent wave form by $L_1$ and $V_b$ is reversible, for an energy-responsive luminescent device which is not intended for an accumulative operation.

However, when the DC bias voltage $V_B$ is applied to the element 100 so that the electrode on the light output side is negative contrary to the other electrode, as shown in FIG. 1, the above-mentioned irreversibility of control does not exist.

Therefore, in order to attain a reversible operation of high sensitivity regardless of the type of dielectric medium, it is desirable to provide means for applying the DC bias voltage so that the polarity of the electrode on the light output side is negative.

The above-mentioned four methods of controlling the operating characteristics can be adopted separately or in combination of two or more of these methods.

In the embodiment of FIG. 1 wherein means for selectively separating the luminescent pulses and means for synchronizing said separation of pulses to the AC operating voltage $V_A$ are schematically shown, the initial or synchronizing signal for the operating voltage $V_A$ is supplied from means for selectively separating the luminescent pulses. Such synchronization can be attained also by other means. One example of such means will be explained in connection with the embodiment of FIG. 1. Either pulse voltage or signal voltage from an AC voltage source is used as base signal voltage to drive the synchronous motor 1010 after necessary frequency multiplying or dividing, shaping and amplifying, and at the same time, the input signal voltage $E_S$ to the AC voltage source 400 is produced from the above-mentioned base signal voltage.

In the luminescent display device of this invention, special consideration is required for the selection of the frequency of the AC operating voltage $V_A$.

An AC–DC EL element has generally a low specific resistance as compared to conventional EL elements in which a dielectric medium of a low dielectric loss is used. Accordingly, the luminescent output of a conventional EL element under an AC excitation is an increasing function of the operating frequency if the operating voltage is unchanged. However, the outputs of the AC–DC EL element at various operating frequencies show peaked characteristics, indicating that there is an appropriate operating frequency that gives a maximum luminescent output. On the other hand, the control rate of the luminescent wave form by the DC bias voltage $V_b$ drops remarkably when the operating frequency exceeds the frequency that gives the maximum luminescent output. Therefore, in order to obtain a high output light $L_2$ and a high energy amplifying factor in the device of this invention, the operating frequency should be selected so that it is the frequency which gives the maximum luminescent output or a frequency slightly lower than that.

In the embodiment shown in FIG. 1, the specific resistance of the AC–DC EL element 100 was approximately $10^9$ ohm-cm. and the operating frequency which gives the maximum luminescent output was 1 kc. For these reasons, the operating frequency of 1 kc. was adopted in the embodiment.

In the above embodiment, a liquid medium was used as dielectric medium. However, in order to obtain an easy-to-handle and stable energy-responsive luminescent device, the dielectric medium constituting the AC–DC EL element should be a light-pervious solid which is either electro-resistive or accumulatively polarizable.

It was found by our experiment that the specific resistance of the dielectric medium is preferably near that of the EL fluorescent material so that the DC bias voltage is applied effectively to the EL material.

As for the ordinary EL fluorescent material such as ZnS, the specific resistance of the dielectric medium for effective control of the wave form is of the order of $10^7$ to $10^{10}$ ohm-cm. Further essential requirements are; that the dielectric medium is not deteriorated by the high temperature originated from ohmic loss in the high sensitivity operation; that the voltage vs. current characteristics is as ohmic as possible; and that the dielectric medium does not deteriorate the EL fluorescent material nor obstruct the luminescent property.

The present inventor has found that an AC–DC EL element which satisfies the above-mentioned conditions can be composed in the following manner.

To manufacture such an AC–DC EL element of the resistive dielectric medium; for example, pulverized frit of boron-silicic acid type, powder of ZnS EL material and powder of electro-resistive (semiconductive) metal oxide such as $SnO_2$, $TiO_2$ or $Sb_2O_5$ which is reflective of the luminescent light from said EL material, are mixed; and this mixture is applied on a plate of glass, ceramics or metal (for example, iron or nickel) which is covered by an electrode of metal oxide film such as a $SnO_2$ film; and then the assembly is heated at a temperature of 600° to 700° C. for 2 to 10 minutes to fuse the frit. Namely, the element is made by dispersing the EL material into a dielectric medium of vitreous material containing an electro-resistive metal oxide.

To manufacture an AC–DC EL element of the accumulatively polarizable dielectric medium, frit of boron-silicic acid type containing Li or Li and Ti is used in the above process. In either case, the specific resistance of the element is controlled by the amount of metal oxide to be mixed.

In the AC–DC EL element as shown in FIG. 1, a substrate of laminated formation is used as one electrode, and the other electrode, light pervious or impervious, is provided on the other side. In the above constitution, the flow point of frit is selected to be lower than the forming temperature of the element, that is, 600°–700° C., and either the softening point or flow point of the substrate is selected to be higher than said forming temperature. Further, the heat expansion coefficients of the materials are selected so as to be in a similar order.

According to this invention, an energy-responsive luminescent display device in the shape of an image panel can be constructed by arranging the elements illustrated in FIG. 1 in a plane.

Though the input energy to the photo-electroconductive element was a light in the above embodiment, Roentgen rays or other radiations can also be used as input energy, as the photo-electroconductive element utilizing CdS, CdSe, CdS:Se or a similar material is responsive to these radiations.

Though a photo-electroconductive element was used as the energy-responsive element in the above embodiment, a piezo-electro-resistive element, a magneto-electro-resistive element, or a similar element can also be used, as an energy-responsive element is usable if its electric resistance varies in response to energy excitation. Further, it will be understood that the input energy may be an elastic energy, a magnetic energy or other types of energy.

In the device of this invention, the light output of the EL element is controlled by the variation of the resistance of the energy-responsive element in the DC (uni-directional) electric field, control of the AC power being unnecessary. Therefore, the effect of the parallel capacitive impedance is eliminated and a very high sensitivity to the input energy is attained with the operation under DC circuit conditions. Thus, if proper matching of the DC resistances between the EL element and the associated energy-responsive element is attained, the intensity of the minimum detectable energy with this device will become the same as that of the energy-responsive element per se, thus making possible a high sensitivity operation which could not be achieved by the conventional devices. Further, the AC electric power required to energize the EL element can be supplied not necessarily through the energy-responsive element but by other means. Therefore, the AC power can be supplied to such an extent that the luminescent output near the highest output of the EL element is derived, regardless of the variation in the resistance or impedance of the energy-responsive element, thus making effective generation of a very high luminescent output possible.

Thus, a very high amplifying factor is obtained in connection with a very low level of minimum detectable energy intensity.

What is claimed is:

1. An energy-responsive luminescent device comprising an electro-resistive electroluminescent element which can be excited to luminescence by applying an AC voltage thereto, the waveform of the luminous output being controllable by a unidirectional voltage applied thereto; an energy-responsive element which varies the electric resistance thereof in response to an energy excitation applied thereto, the maximum resistance of said energy-responsive element being not lower than that of said electroluminescent element; a capacitive element; means for applying a unidirectional voltage to said electroluminescent element through said energy-responsive element; and means for applying an AC voltage to said electroluminescent element through said capacitive element.

2. An energy-responsive luminescent device according to claim 1, wherein said electroluminescent element is connected in series with said energy-responsive element and said capacitive element is connected in parallel with said energy-responsive element, the capacitance of said capacitive element being chosen so as to be substantially larger than the capacitive component of said energy-responsive element.

3. An energy-responsive luminescent device according to claim 2, wherein the impedance of said capacitive element is chosen so as to be lower than the impedance of both said electroluminescent element and said energy-responsive element for a predetermined frequency of the AC voltage.

References Cited

UNITED STATES PATENTS

| | | | |
|---|---|---|---|
| 3,050,654 | 8/1962 | Toulon | 315—169 X |
| 3,130,348 | 4/1964 | Lieb | 315—169 X |
| 3,154,720 | 10/1964 | Cooperman | 315—169 |
| 3,311,781 | 3/1967 | Duinker et al. | 315—169 X |
| 3,351,937 | 11/1967 | Spens | 315—169 X |
| 3,385,992 | 5/1968 | Chaberski | 315—169 X |
| 3,387,271 | 6/1968 | Chernow | 315—169 X |
| 3,409,876 | 11/1968 | Uphoff | 315—169 X |

JOHN HUCKERT, Primary Examiner

A. J. JAMES, Assistant Examiner

U.S. Cl. X.R.

315—173; 340—166